US006351645B1

(12) United States Patent
Suzuki et al.

(10) Patent No.: US 6,351,645 B1
(45) Date of Patent: Feb. 26, 2002

(54) WIRELESS SELECTIVE CALLING RECEIVER AND EXTERNAL REGISTERING DEVICE THEREFORE

(75) Inventors: Hidenori Suzuki, Miyagi; Hideki Kuga, Kanagawa, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/183,904

(22) Filed: Oct. 30, 1998

(30) Foreign Application Priority Data

Nov. 11, 1997 (JP) .............................................. 9-323955

(51) Int. Cl.$^{7}$ .................................................. H04Q 7/20
(52) U.S. Cl. ........................ 455/458; 455/557; 455/575
(58) Field of Search ................................ 455/458, 557, 455/575, 550

(56) References Cited

U.S. PATENT DOCUMENTS

| | | | | | |
|---|---|---|---|---|---|
| 5,043,721 | A | * | 8/1991 | May | 340/825.44 |
| 5,177,478 | A | * | 1/1993 | Wagai et al. | 340/825.44 |
| 5,365,227 | A | * | 11/1994 | Cannon et al. | 340/825.55 |
| 5,446,759 | A | * | 8/1995 | Campana, Jr. | 375/267 |
| 5,459,456 | A | * | 10/1995 | Hosac et al. | 340/825.44 |
| 5,493,437 | A | * | 2/1996 | Lebby et al. | 359/152 |
| 5,644,410 | A | * | 7/1997 | Suzuki et al. | 358/471 |
| 5,687,216 | A | * | 11/1997 | Svensson | 379/58 |
| 6,044,250 | A | * | 3/2000 | Kuramatsu et al. | 455/130 |
| 6,178,336 | B1 | * | 1/2001 | Crozat | 455/558 |

FOREIGN PATENT DOCUMENTS

| | | | | |
|---|---|---|---|---|
| JP | 11122398 | * | 4/1999 | H04N/1/00 |

* cited by examiner

*Primary Examiner*—Daniel Hunter
*Assistant Examiner*—Charles Chow
(74) *Attorney, Agent, or Firm*—Pearne & Gordon LLP

(57) ABSTRACT

A wireless selective calling receiver 10 and an external registering device 20 are connected to each other through a signal transmitting line 8. Optional character or pattern data inputted by the external registering device 20 are converted into electrical signal data in the external registering device 20, and outputted to the wireless selective calling receiver 10. The character or pattern data which have been converted into the electrical signal data are applied through the signal transmitting line 8 to the control section 2 of the wireless selective calling receiver 10, and are stored in the memory section 3 of the wireless selective calling receiver 10 or directly stored in the memory section of the wireless selective calling receiver 10 from the external registering device 20, whereby optional character or pattern data inputted by the external registering device 20 can be newly registered in the memory section in the wireless selective calling receiver 10.

7 Claims, 1 Drawing Sheet

WIRELESS SELECTIVE CALLING RECEIVER AND EXTERNAL REGISTERING DEVICE THEREFORE

BACKGROUND OF THE INVENTION

This invention relates to wireless selective calling receivers having a display function, and more particularly to a wireless selecting calling receiver in which desired characters or pattern data can be registered in its memory device.

Characters or patterns which can be displayed by a wireless selective calling receiver having a display function are those based on the characters or pattern data which have been registered in the memory device of the receiver.

However, in the display system of the above-described conventional wireless selective calling receiver is disadvantageous in the following points: That is, it can display only the characters or pattern data which have been registered in its memory device, and the characters or pattern data registered in the memory device cannot be changed.

SUMMARY OF THE INVENTION

Accordingly, an object of the invention is to eliminate the above-described difficulties accompanying a conventional wireless selective calling receiver. More specifically, an object of the invention it to provide a wireless selective calling receiver in which, in order to change or add the characters or patterns displayed on its display unit, a desired character or pattern is formed, and registered in its memory device.

In order to solve the above-described problems, the invention provides a wireless selective calling receiver which is able to register formed optional character or pattern data in a memory device therein, or change character or pattern data which have been registered; and an external registering device which is able to register formed optional character or pattern data in the memory device of the wireless selective calling receiver or change character or pattern data which have been registered. The wireless selective calling receiver is connected to the external registering device through connecting means, so that, instead of fixed character or pattern data which have been registered, optional character or pattern data are registered.

According to the present invention, a wireless selective calling receiver is connectable to an external registering device, and is possible to register optional character or pattern data which are formed by the external registering device. Hence, with the receiver, in addition to character and pattern data which have been registered in advance, optional character and pattern data which are formed by the external registering device can be registered.

Further, according to the present invention, a wireless selective calling receiver which is connectable to an external registering device, and is possible to register optional character or pattern data which are formed by the external registering device instead of character or pattern data which have been registered in advance. Hence, instead of the character or pattern data which have been stored in advance, optional character or pattern data which are formed by the external registering device can be registered.

Furthermore, according to the present invention, an external registering device which is connectable to a memory device in a wireless selective calling receiver having a display function, and is possible to register formed optional character or pattern data in the memory device in the wireless selective calling receiver through connecting means. When the external registering device is connected to the wireless selective calling receiver through connecting means, character or pattern data formed by the external registering device can be registered in the memory deice of the wireless selective calling receiver.

Moreover, according to the present invention, an external registering device which is connectable to a memory device in a wireless selective calling receiver has a display function, and is possible to register formed optional character and pattern data in the memory device in the wireless selective calling receiver instead of character and pattern data which have been registered in the memory device through connecting means. Hence, character and pattern data formed by the external registering device can be exchanged for the character or pattern data which have been registered in the memory device of the wireless selective calling receiver.

Still further, according to the present invention, a wireless selective calling receiver in which optional character or pattern data formed by an external registering device are combined with character or pattern data which have been registered in advance, to form novel character or pattern data, which are registered. Hence, instead of the character or pattern data which have been registered in advance, formed optional character or pattern data can be registered.

Still further, according to the present invention, an external registering device in which formed optional character or pattern data are combined with character or pattern data which have been registered in a memory device in a wireless selective calling receiver, to form novel character or pattern data, which are registered in the memory device in the wireless selective calling receiver. Instead of the character or pattern data which have been registered in the memory device of the wireless selective calling receiver, optional character or pattern data formed by the external registering device can be registered.

DETAILED DESCRIPTION OF THE PREFERRED EMBODIMENTS

A preferred embodiment of the invention will be described with reference to the accompanying drawings.

Figure 1:
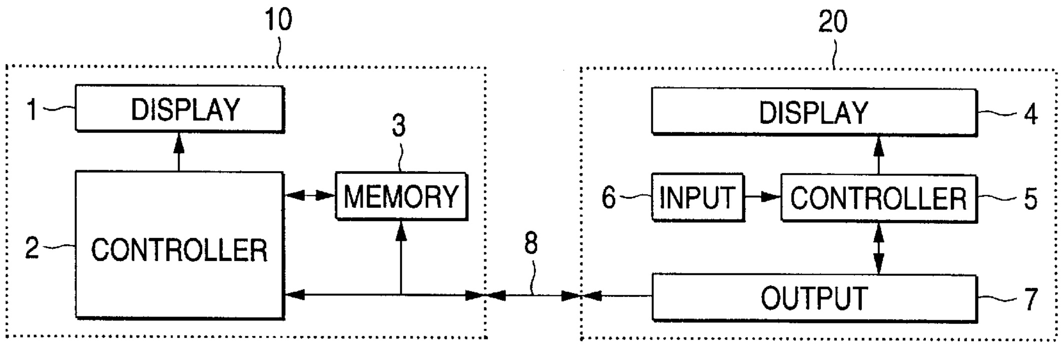
FIG. 1 is a diagram showing the arrangement of a wireless selective calling receiver and an external registering device, which constitutes an embodiment of the invention.

FIG. 1 is a block diagram showing the arrangements of a wireless selective calling receiver and an external registering device which constitutes an embodiment of the invention. In FIG. 1, reference numeral 10 designates the wireless selective calling receiver of the invention (hereinafter referred to merely as "a receiver 10", when applicable), which comprises a display section 1, a control section 2, and a memory section 3. The display section 1 is to visually display characters or patterns. The control section 2 is to control the outputting of characters or patterns to the display section 1 and to control the characters or pattern data which have been stored in the memory section 3. The memory section 3 is to store characters or pattern data to be displayed.

In FIG. 1, reference numeral 20 designates the external registering device (hereinafter referred to merely as "a device 20", when applicable), which comprises a display section 4, a control section 5, an input section 6, and an output section 7. The input section 6 is to make it possible to input characters or patterns. The display section 4 is to visually display character or patterns after the control section 5 recognizes the characters or patterns thus inputted. The output section 7 functions as follows: After the control section 5 (described later) converts the inputted characters or patterns into electrical signal data, the output section 7 makes it possible to store them in the wireless selective calling receiver. The control section 5 recognizes the inputted characters or patterns and causes them to be displayed on the display section 4, and converts the inputted characters or patterns into electrical data which are sent to the output section 7 adapted to resister the inputted characters or patterns in the wireless selective calling receiver 10.

The operations of the wireless selective calling receiver 10 and the external registering device 20 which have been constructed as described above, will be described.

In the case where it is required to newly register a character or pattern which are to be displayed on the display section 1 of the wireless selective calling receiver 10, first of all a character or pattern to be newly stored is inputted by the input section of the external registering device 20. The character or pattern thus inputted is recognized by the control section 5, so that the character or pattern is converted into electrical signal data by the latter 5 which is outputted. In this case, the wireless selective calling receiver 10 apply the address in the memory section 3 where the character or pattern is newly stored to the external registering device 20, so that the operator is allowed to recognize the address. One signal data is displayed on the display section of the external registering device 20; that is, the operator who has inputted the character or pattern is allowed to recognize the newly stored character or pattern and its storing address. The other signal data is transmitted from the control section 5 to the output section 7, and sent through a signal transmitting line 8 to the wireless selective calling receiver 10.

The character or pattern data thus transmitted to the wireless selective calling receiver is sent to the control section 2 and the memory section 3 therein. The character or pattern data is transmitted through the control section 2, so that one of the signal data is stored in a newly storing address in the memory section 3 in the wireless selective calling receiver 10, the other is displayed on the display section 1. In this case, the wireless selective calling receiver 10 applies the address to the external registering device 20 where the data is to be stored in the memory section. Alternatively, the embodiment may be so modified that a character or pattern data is directly stored in the memory section 3 in the wireless selective calling receiver 10. The character or pattern data stored in the memory section 3 in the wireless selective calling receiver 10, similarly as in the case the characters or pattern data which have been stored before, are displayed on the display section 1 in the wireless selective calling receiver 10.

The character or pattern displayed on the display section 1 of the wireless selective calling receiver 10, is changed as follows: First, the character or pattern data stored in the memory section 3 in the wireless selective calling receiver 10, and its address are applied to the external registering device 20. Under this condition, the input section 6 of the external registering device 20 is operated to store a new character or pattern to in the address of the character or pattern to be renewed. The character or pattern thus inputted is recognized by the control section 5 of the external registering device, and converted into electrical signal data which is outputted. In this operation, the wireless selective calling receiver 10 applies the address, which is changed in the memory section 3, to the external registering device 20, to allow the operator to recognize it. One of the signal data is displayed on the display section 4 of the external registering device 20; that is, the character or pattern to be changed and its storing address are displayed for the operator who has inputted the character or pattern. The other signal data is transmitted from the control section 5 to the output section 7, and sent through the signal transmitting line 8 to the wireless selective calling receiver 10.

The character or pattern data sent to the wireless selective calling receiver 10 are transmitted to the control section 2 and the memory section 3 in the wireless selective calling receiver 10. And, the character or pattern data are transmitted through the control section 2 of the wireless selective calling receiver); more specifically, one of the signal data is newly stored in the existing address in the memory section 3 of the receiver 10, while the other is displayed on the display section 1. In this case, the wireless selective calling receiver 10 applies the addresses of character or pattern data changed in the memory section 3 to the external registering device 20. Alternatively, the embodiment may be so modified that the character or pattern data are stored directly in the memory section 3 of the receiver 10. The character or pattern data, which have been stored in the memory section 3 of the receiver 10, similarly as in the case of the character or pattern data which have been registered, are displayed on the display section 1 of the receiver 10.

Figure 2:
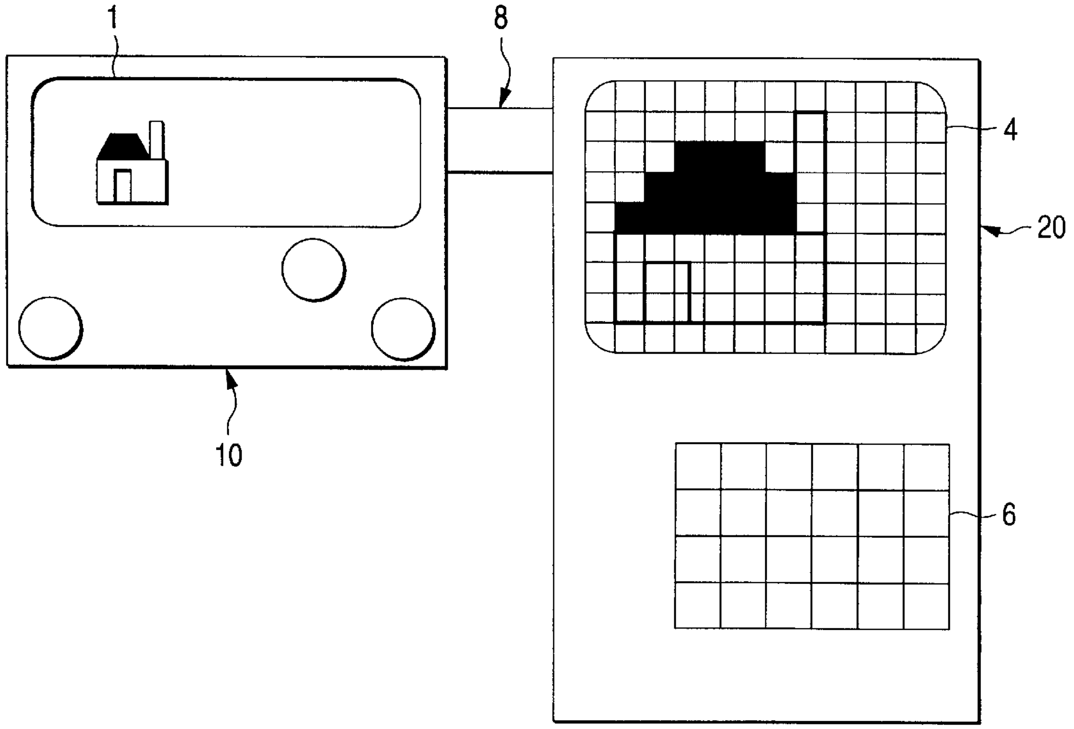
FIG. 2 is a diagram showing an example of a pattern which is newly registered by the wireless selective calling receiver and the external registering device of the invention.

FIG. 2 is a diagram for a description of the operations of the receiver 10 and the device 20 in the following case: The input pattern is "a house with a chimney". The input pattern is actually inputted with the input section 6 of the device 20. The pattern data thus inputted is displayed on the display section 4 under the control of the control section 5 of the device 20, and is transmitted through the output section 7 and the signal transmitting line 8 to the receiver 10, so as to be stored in the memory section 3 of the receiver 10 and displayed on the display section 1.

As is seen from FIG. 2, in FIG. 1 the input section 6 and the display section 4 in the device 2 are different blocks; however, they may be one unit in which the input section 6 is a tablet with a pen, and the display section 4 is a liquid crystal display unit.

The signal transmitting line 8 through which the receiver 10 and the device 20 are connected to each other may be a cable which has terminal connectors at both ends which are readily connected to the receiver 10 and the device 20.

As was described above, the invention provides the wireless selective calling receiver which is able to register formed optional character or pattern data in the memory device therein, or change character or pattern data which have been registered; and an external registering device which is able to register formed optional character or pattern data in the memory device of the wireless selective calling receiver or change character or pattern data which have been registered. The wireless selective calling receiver is connected to the external registering device through the connecting means, so that, instead of the fixed character or pattern data which have been registered, optional character or pattern data can be registered.

What is claimed is:

1. A wireless selective calling receiver comprising:

display means for displaying character or pattern;

memory means for storing a set of characters and pattern data; and controller for controlling operations of said display means and said memory means to display the character or pattern on said display means, wherein said memory means is connectable to an external registering device, said external registering device newly registering into said memory means optional character or pattern data, which is formed by said external registering device.

2. A wireless selective calling receiver comprising:

display means for displaying character or pattern;

memory means for storing a set of characters and pattern data; and controller for controlling operations of said display means and said memory means to display the character or pattern on said display means, wherein said controller is connectable to an external registering device, and is possible to modify character or pattern data which have been registered in advance by said external registering device.

3. A wireless selective calling receiver according to claim 2, wherein said controller is able to modify character or pattern data which have been registered in advance by said external registering device with respect to character or pattern data which is newly registered.

4. An external registering device comprising: input means for inputting character or pattern;

display means for displaying said character or pattern; and controller for converting the character or pattern input by said input means into electrical signal, wherein said controller is connectable to a memory device in a wireless selective calling receiver having a display function, and is possible to register formed optional character or pattern data in said memory device of said wireless selective calling receiver.

5. An external registering device comprising:

input means for inputting character or pattern;

display means for displaying said character or pattern; and controller for converting the character or pattern input by said input means into electrical signal, wherein said controller is connectable to a memory device in a wireless selective calling receiver has a display function, and is possible to modify character or pattern data which have been registered in advance by said external registering device.

6. A wireless selective calling receiver comprising:

display means for displaying character or pattern;

memory means for storing a set of characters and pattern data; and controller for controlling operations of said display means and said memory means to display the character or pattern on said display means, wherein said controller is connectable to an external registering device, and is possible to newly register new character or pattern data into said memory means, said new character or pattern data are formed by combining optional character or pattern data formed by an external registering device with character or pattern data which have been registered in advance.

7. An external registering device comprising:

input means for inputting character or pattern;

display means for displaying said character or pattern; and controller for converting the character or pattern input by said input means into electrical signal, wherein said controller is connectable to a memory device in a wireless selective calling receiver has a display function, and is possible to newly register new character or pattern data into the memory device of said wireless selective calling receiver, said new character or pattern data are formed by combining optional character or pattern data formed by an external registering device with character or pattern data which have been registered in advance.

* * * * *